United States Patent [19]
Zirps

[11] 3,868,972
[45] Mar. 4, 1975

[54] HYDRAULIC PRESSURE COMPENSATOR

[75] Inventor: Wilhelm Zirps, Hemmingen, Germany

[73] Assignee: Robert Bosch GmbH, Stuttgart, Germany

[22] Filed: Sept. 27, 1973

[21] Appl. No.: 401,501

[30] Foreign Application Priority Data
Nov. 4, 1972  Germany............................ 2254032

[52] U.S. Cl. ................................................ 138/30
[51] Int. Cl. ............................................ F16l 55/00
[58] Field of Search .................. 138/30, 31; 73/392; 137/568

[56] References Cited
UNITED STATES PATENTS
| | | | |
|---|---|---|---|
| 1,984,868 | 12/1934 | Deming............................ | 138/30 X |
| 2,175,460 | 10/1939 | Guildford........................ | 138/30 UX |
| 3,174,658 | 3/1965 | Wittenberg et al. .............. | 138/30 X |
| 3,333,600 | 8/1967 | Mercier............................ | 138/30 X |

*Primary Examiner*—Jerry W. Myracle
*Attorney, Agent, or Firm*—Michael S. Striker

[57] ABSTRACT

A hydraulic conduit and a pressure vessel having an interior chamber provided with an opening cooperate with one another. A flexible partition subdivides the chamber into a first compartment which communicates with the opening, and a second compartment which contains a body of compressed gas which normally flexes the partition wall into the first compartment and against the opening. Connecting passages are provided which so connect the hydraulic conduit with the opening that hydraulic fluid flowing in the conduit is conducted in its entirety through the first compartment at least at such times as the flexible partition is out of contact with the opening.

7 Claims, 6 Drawing Figures

3,868,972

HYDRAULIC PRESSURE COMPENSATOR

BACKGROUND OF THE INVENTION

The present invention relates generally to a hydraulic system construction, and more particularly to a hydraulic system in which a pressure vessel is interposed.

In hydraulic systems, and also in other applications, it is frequently desirable or necessary to utilize a pressure vessel as part of the system. If such a vessel is used in a hydraulic system, its purpose is to dampen sudden peaks in the hydraulic pressure and to compensate for periodic pressure fluctuations. The pressure vessel is connected with the hydraulic system itself in a by-pass arrangement, that is not the entire amount of hydraulic fluid flows through the pressure vessel but only a partial amount which is equivalent to the pressure variation in the system. For this reason, such pressure vessels have only an inlet opening. The gas volume in the pressure vessel, and the pressure medium located intermediate the compartment of the pressure vessel which contains the gas volume and the branching-off location constitute a resonator whose inherent frequency is relatively low.

In hydraulic systems the speed at which pressure variations take place is rather large, and for this reason these pressure vessels which are incorporated in the systems have been found to have only little effect. An attempt has been made in the prior art to overcome the problem providing a pressure vessel having two bores which communicate with its interior chamber and which serve as inlet and outlet of hydraulic fluid, respectively. A piston-like body is arranged adjacent the elastic partition which subdivides the interior of the chamber into a compartment for hydraulic fluid and a compartment accommodating compressed gas, and this body is movable with the flexible partition and opens only a small flow-through cross section. The purpose is to assure that the pressure vessel will respond more rapidly to pressure fluctuations in the hydraulic system, because a portion of the hydraulic fluid in the system flows through the pressure vessel. It has been found, however, that this arrangement has the disadvantage that only a small portion of the total flow of hydraulic fluid can act upon the flexible partition so that the pressure vessel will not respond rapidly enough to pressure fluctuations in the system.

Another prior-art proposal uses a tubular pressure vessel which is interposed between two sections of a hydraulic compartment. Such a pressure vessel has a tubular outer part, and an elastic tubular partition through which the hydraulic fluid flows, and which defines with the outer wall a chamber accommodating gas under pressure. A rigid wall provided with many openings is located within the passage surrounded by the flexible partition so that hydraulic fluid can through the openings into contact with the partition. Also, this rigid wall has the purpose to limit the flexing of the partition in inward direction. The problem with this arrangement is that on occasion portions of the flexible partition can become pressed into the openings of the rigid wall and may become damaged in so doing. Moreover, this construction is expensive to produce.

SUMMARY OF THE INVENTION

It is, accordingly, an object of the present invention to overcome the disadvantages of the prior art.

More particularly, it is an object of the present invention to provide, in a hydraulic system, a pressure vessel of the type mentioned above, which is simple in construction, therefore inexpensive to produce, and which is capable of responding very rapidly to pressure fluctuations in the hydraulic system.

In keeping with these objects and with others which will become apparent hereafter, one feature of the invention resides in a hydraulic system, in a combination comprising a hydraulic conduit for the flow of hydraulic fluid. The pressure vessel has a chamber provided with an opening, and a flexible partition subdivides the chamber into a first compartment communicating with the opening and a second compartment adapted to contain a body of gas under pressure which normally flexes the partition wall into the first compartment and against the opening. Connecting means so connects the hydraulic conduit with the opening that hydraulic fluid flowing in the former is conducted in its entirety through the first compartment, at least at such times as the flexible partition wall is out of contact with the opening.

With this arrangement the disadvantages of the prior art are overcome because the inherent frequency of the pressure vessel is increased due to the fact that the entire amount of the hydraulic fluid can pass through the pressure vessel, so that even pressure fluctuations which are rapid and of brief duration are well dampened.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
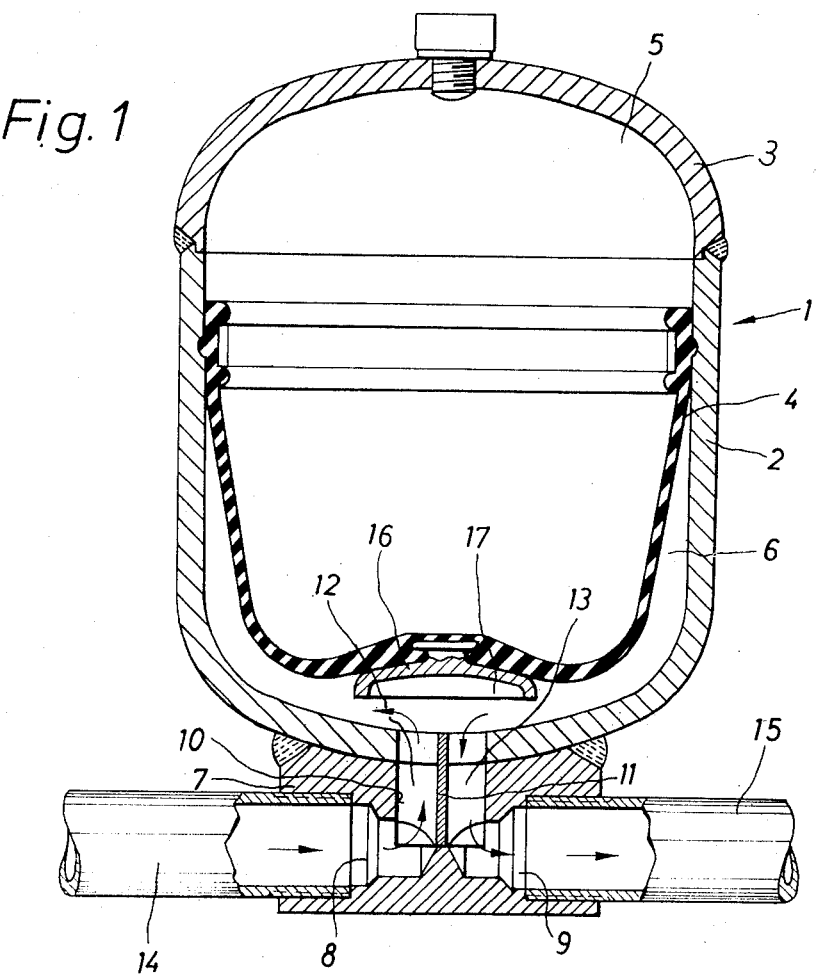
FIG. 1 is an axial section through a first embodiment of the invention.

Discussing firstly the embodiment illustrated in FIG. 1, it will be seen that reference numeral 1 identifies a pressure vessel having a substantially cylindrical lower housing part 2 and an upper housing part 3 which resembles a cover that is welded to housing part 2. An elastic diaphragm or flexible partition wall 3 is located in the interior of the housing composed of the parts 2 and 3, and subdivides the interior chamber of this housing into a compartment 5 which contains a body of compressed gas and a compartment 6 into which hydraulic fluid is to be allowed to enter. A connecting member 7 is connected with the lower housing part 2, and is provided with two blind bores the longitudinal axes of which extend normal to the longitudinal axis of the housing 2, 3. These bores are identified with reference numerals 8 and 9 and communicate with an inlet passage 10 which communicates in turn with the chamber 6. The passage 10 is subdivided by a fixed wall 11 into two indeitcally sized passages 12 and 13, and the wall 11 will be seen to extend in the direction of the longitudinal axis of the housing 2, 3 and transverse to the blind bores 8 and 9. It extends exactly to the inner surface of the housing wall and is flush with the same. It will be seen that a communication between the bores 8 and 9 is possible only via the interior of the housing.

Conduit sections 14 and 15 are connected with the bores 8 and 9, respectively and these sections 14 and 15 form part of a hydraulic conduit. A cover plate 16 is mounted on the lower portion of the flexible partition wall 4, having a recess 17 which faces the passage 12. The diameter of the plate 16 is greater than the diameter of the passage 12.

Figure 2:
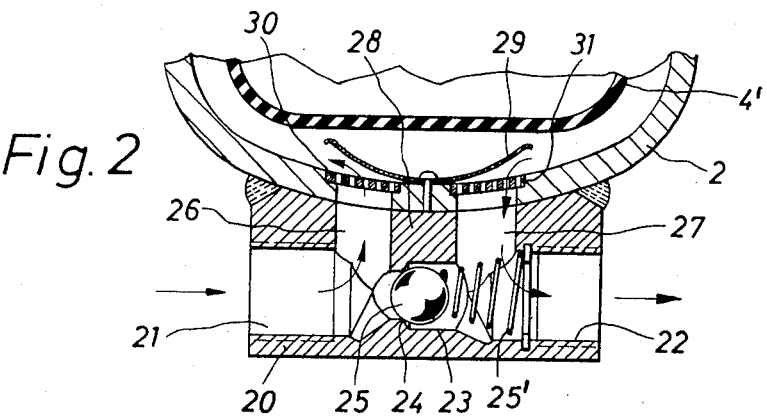
FIG. 2 is a view similar to FIG. 1, but of a second embodiment of the invention.

It will be appreciated that if in operation of the system the pressure of the hydraulic fluid is greater than that of the gas in the compartment 5, the partition wall 4 will be partly pushed back, that is it will be out of engagement with the opening or passage 12. Thus, the plate 16 is withdrawn from the inner wall of the housing. When pressure fluid flows in the conduit section 14 towards the member 7, it can enter into the conduit section 15 only by passing through the compartment 6. This means that the entire amount of pressure fluid flowing in the conduit section 14 must pass through the compartment 6 before it can enter the conduit section 15, whereby the response of the pressure vessel to brief and rapid fluctuations in the system becomes much more refined than was possible heretofore, where such a pressure vessel was connected in a system by-pass arrangement. If the pressure of the gas in the compartment 5 is greater than the pressure of the hydraulic fluid, then the partition wall 4 is expanded until it contacts the inner surface of the housing 4 and the plate 16 overlies and closes the opening 10. However, in this condition, pressure fluid can continue to pass from the conduit section 14 into the conduit section 15 because it can flow through the recess 17 of the plate 16. It will not, however, enter the chamber 6. The embodiment of FIG. 2, wherein like reference numerals identify like elements as in FIG. 1, differs from the embodiment of FIG. 1 in that the member 7 has been replaced with a member 20 which is provided with two blind bores 21 and 22, which are connected with one another by a stepped bore 23. A shoulder 24 of the stepped bore 23 serves as the valve seat for a ball-shaped valve member 25 which is biased against the valve seat by a spring 25'. The valve member 25 can move to valve-opening position in the direction from the bore 21 towards the direction 22. A bore 26 extends from the bore 21 and communicates with the interior of the housing. A bore 27 extends from the bore 22 and also communicates with the interior of the housing, namely with the compartment 6. The bores 26 and 27 are separated from one another by a wall portion 28 on which there is mounted a springy cover plate 29 which extends past the bores 26 and 27. The terminal openings of the bores 26 and 27 at the inner wall of the housing are covered by perforate plates 30 and 31.

In this arrangement if hydraulic fluid under pressure flows into the bore 21 and if the partition wall is compressed, that is pushed back into the chamber 5, due to an excess of pressure of the hydraulic fluid versus the pressure of the gas in the chamber 5, then the hydraulic fluid can pass from the bore 21 into the bore 22 only by traversing the bores 26, 27 and the chamber 6. This means that the entire amount of hydraulic fluid in the conduit must pass through the chamber 6. On the other hand, if the flexible partition wall is fully extended, then it presses the plate 29 against the openings of the bores 26 and 27. In this condition, the valve member 25 is lifted off its valve seat and pressure fluid in the hydraulic conduit can now pass directly from the bore 21 into the bore 22 without having to pass through the compartment 6.

Figure 3:
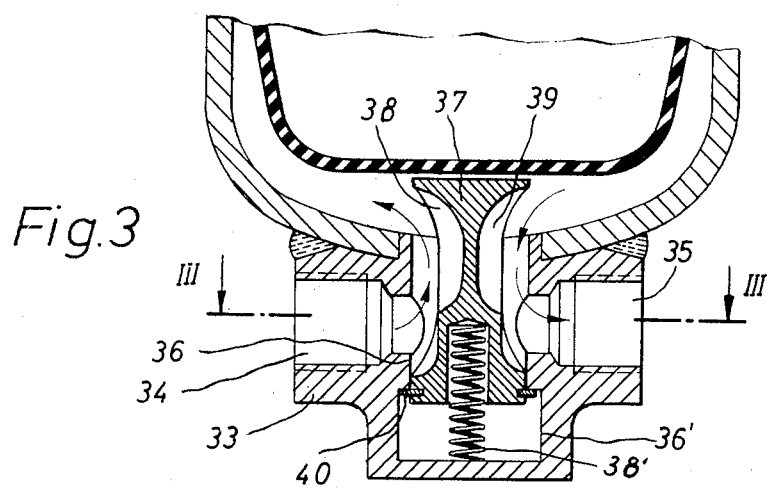
FIG. 3 is a view similar to FIG. 2 illustrating a third embodiment of the invention.
Figure 3A:
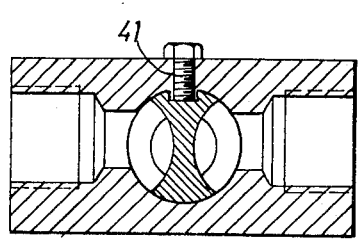
FIG. 3a is a section taken on line III—III of FIG. 3.

The embodiment in FIG. 3 and FIG. 3a is also reminiscent of the preceding embodiments, differing again by the fact that the member 7 of FIG. 1 has been replaced with a member 33. The member 3 is provided again with two bores 34 and 35 which communicate with a blind bore 36 the longitudinal axis of which is coincident with the longitudinal axis of the housing 2, 3. A slide member 37 is slidably accommodated in the upper part of the bore 36 and is biased to open position by a spring 38' when the partition wall is compressed against the action of the gas in the compartment 5. The slide member 37 is provided with two longitudinal grooves or recesses 38, 39 which face the bores 34, 35 respectively, and extend approximately half the length of the slide member 37. The upper position of the slide member is defined by an abutment 40. When the slide member 37 is in this upper position, and hydraulic fluid enters the bore 34, then this fluid moves along the groove 38 into the compartment 6 and out of the same along the groove 30 into the bore 35. If the partition is fully expanded, then it pushes the slide member 37 downwardly until the upper edge of the latter is flush with the inner surface of the housing wall. In this condition, the grooves 38 and 39 extend into the lower part 36' of the bore 36, the diameter of which is slightly larger than the remainder of the bore. In this case, hydraulic fluid can pass via the grooves 38, 39 and the lower part 36' of the bore 36, from the bore 34 into the bore 35. A screw 41 prevents the slide member 37 from turning.

Figure 4:
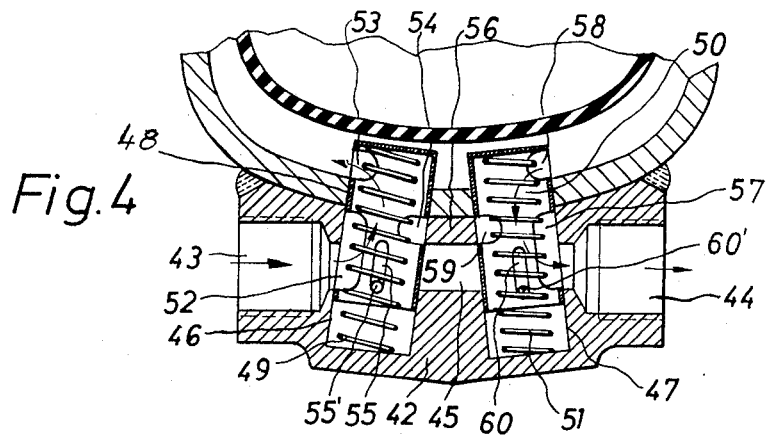
FIG. 4 is a view similar to FIG. 3 illustrating the fourth embodiment of the invention.

The embodiment in FIG. 4 is again reminiscent of the preceding embodiments, replacing the member 7 of the embodiment in FIG. 1, with the member 42 which is again provided with two bores 43 and 44 which are connected with one another by an additional bore 45. Two inclined bores 46 and 47 communicate with the bore 45 and include with one another an acute angle, the basis of which is located in the interior of the housing 2, 3. A substantially tubular or sleeve-shaped member 48 is guided in the bore 46, being urged in the direction inwardly of the housing by a spring 49. A similar sleeve-shaped slide member 50 is guided in the bore 47 being also urged inwardly of the housing by a spring 51. Four cutouts 52, 53, 54 and 55 are formed in the member 48. The cutout 52 faces the bore 43 and cooperates with the same. The cutout 53 is located above and at the same side as the cutout 52, being located within the housing when the slide member 48 is shifted inwardly of the housing. The cutout 54 is located at the opposite side and is covered by a wall portion 56 when the slide member is in the position in which the cutout 53 is located within the housing. A spring 55' extends into the cutout 55 and serves to prevent turning of the slide member 48. Four cutouts, 57, 58, 59 and 60 are similarly provided in the slide member 50 and their arrangement is the same as that of the cutouts in the slide member 48. A pin 60' extends into the cutout 60 and prevents turning of the slide member 50.

In this embodiment when hydraulic fluid enters the bore 53 and the flexible partition wall is compressed, the hydraulic fluid flows via the cutout 52 into the interior of the slide member 48 and enters at 53 into the compartment 6 from where it flows via the cutout 58 into the interior of the slide member 50 and from there via the cutout 57 into the bore 44. The cutouts 54 and 59 are blocked by the wall portion 56 so that all of the hydraulic fluid entering at 43 must pass through the compartment 6.

On the other hand, when the partition wall is fully expanded, then it pushes the slide member 48 and 50 into the bores 46 and 47 so that hydraulic fluid entering the bore 43 can now pass directly through the cutout 52 into the cutout 54 and into the bore 45 and from there into the slide member 50 from where it flows via the cutout 59 and the cutout 57 into the bore 44.

Figure 5:
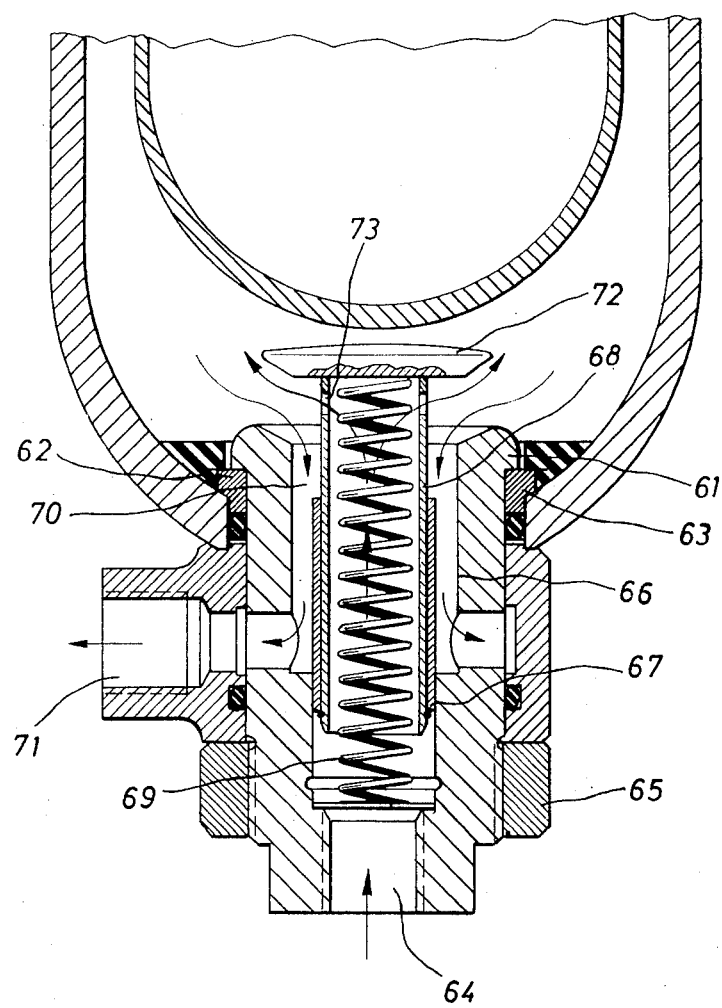
FIG. 5 is a view similar to FIG. 4 illustrating a fifth embodiment of the invention.

Coming, finally, to the embodiment illustrated in FIG. 5, it will be seen that the member 7 of FIG. 1 has here been replaced with a member 61 which is retained by a shoulder 63 of a foldable ring 62 which latter is located in the interior of the housing 2, 3. A fluid inlet 64 is provided which is pressed by a nut 65 against the housing 2, 3 together with the member 61. Such constructions for this mounting purpose are already known.

A longitudinal bore 66 is provided in the member 61, having a lower portion 67 which is tapered and which serves for guiding a valve body 68 which is urged in open position by a spring 69 when the elastic partition wall is compressed. The valve body 68 is hollow and directly communicates with the bore 66, 67 which serves as the inlet bore. The upper part of the bore 66 permits play with respect to the valve body, so that an annular space 70 exists which is in communication with an outlet bore 71 formed in the member 61. The valve body 68 has a substantially mushroom-shaped closure portion 72 at its end which faces the partition wall, underneath the head of which closure portion there are formed several radial openings or bores 73 which communicate with the interior of the valve body 68.

If, in this construction hydraulic fluid enters at the lower part of the bore 66, 67 and if the valve member 68 is in its open position, then all of the pressure fluid of the hydraulic system passes through the hollow interior of the valve body 68 and the radial bores 73 into the compartment 6 from where it passes through the annular space 70 into the outlet bore 71. On the other hand, if the partition wall is fully expanded, then the head of the portion 72 overlies the upper part of the member 61 and thus interrupts the communication with the chamber 6. Hydraulic fluid now passes through the interior of the valve body 68 and radial bores 73 directly into the space 70 and from there into the bore 71.

It will be understood that each of the elements described above, or two or more together, may also find a useful application in other types of constructions differing from the types described above.

While the invention has been illustrated and described as embodied in a hydraulic system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended claims:

1. In a hydraulic system, a combination comprising a hydraulic conduit for the flow of hydraulic fluid; a pressure vessel having a chamber provided with an opening; a flexible partition wall subdividing said chamber into a first compartment communicating with said opening, and a second compartment containing a body of gas under pressure so that said partition wall is normally flexed into said first compartment and against said opening to close the same; and connecting means connecting said hydraulic conduit with said opening, said connecting means defining a first flow path for said hydraulic fluid which conducts said hydraulic fluid in its entirety through said first compartment when said flexible partition wall is out of contact with said opening, and a second bypass flow path for said hydraulic fluid which is open and bypasses said first compartment when said flexible partition wall is in contact with said opening.

2. A combination as defined in claim 1, wherein said first and second flow paths comprise wall means defining an input passage communicating with said conduit and said opening, and an output passage also communicating with said conduit and said opening, said passages communicating with one another only via said first compartment.

3. A combination as defined in claim 2, wherein said partition includes a portion which is normally urged by said body of gas into engagement with said opening, said portion having a side facing said opening and provided with a recess which communicates with said opening and said passages when said portion is in engagement with said opening, so that fluid can flow through said conduit, said passages and said recess when said portion is in engagement with said opening.

4. A combination as defined in claim 1, said connecting means comprising a connecting passage connecting an input and an output passage which communicate with said opening; and a valve interposed in said connecting passage and adapted to permit flow of hydraulic fluid from said input passage into said output passage.

5. A combination as defined in claim 1, said connecting means comprising an input passage and an output passage which each communicate with said opening and said conduit; a slide member arranged in said opening and having opposite sides which respectively face said input passage and said output passage and which are each provided with a recess which communicate with one another, so that said passages are in communication even when said partition wall is deflected against said opening; and biasing means biasing said slide member inwardly of said first compartment.

6. A combination as defined in claim 1, said connecting means comprising an input passage and an output passage each communicating with said conduit, a pair of bores each communicating with one of said passages and with said first compartment, and a pair of spring-biased shiftable partially hollow cylindrical slide members accommodated in the respective bores and provided with recesses via which said passages communicate with one another in dependence upon the extent to which said partition wall is deflected against said opening.

7. In a hydraulic system, a combination comprising a hydraulic conduit for the flow of hydraulic fluid; a pressure vessel having a chamber provided with an opening; a flexible partition wall subdividing said chamber into a first compartment communicating with said opening and a second compartment containing a body of gas under pressure, so that said partition wall is normally flexed into said first compartment and against said opening to close the same; connecting means connecting said hydraulic conduit with said opening, including a hollow cylindrical valve body located in said opening and forming an inlet passage and being provided with a plurality of radial ports therein, and an outlet passage, so that hydraulic fluid flowing in said opening is conducted in its entirety through said first compartment at such time as said flexible partition wall is out of contact with said opening; and biasing means acting upon said valve body and tending to displace the same between a first position in which said inlet and outlet passages communicate via said radial ports and a second position in which said inlet and outlet passages communicate via said first compartment.

* * * * *